May 6, 1969 A. M. HESTAD 3,443,125

TONE SUPPLY GATE CIRCUIT

Filed May 26, 1966

INVENTOR
A. M. HESTAD

ATTORNEY

United States Patent Office 3,443,125

Patented May 6, 1969

3,443,125

TONE SUPPLY GATE CIRCUIT

Alfred M. Hestad, Chicago, Ill., assignor to International Telephone and Telegraph Corporation, New York, N.Y., a corporation of Maryland Filed May 26, 1966, Ser. No. 553,200
Int. Cl. H03k *17/56*
U.S. Cl. 307—253 7 Claims This invention relates to tone supply circuits and more particularly to gate circuits for supplying such tone.

Figures 1, 2:
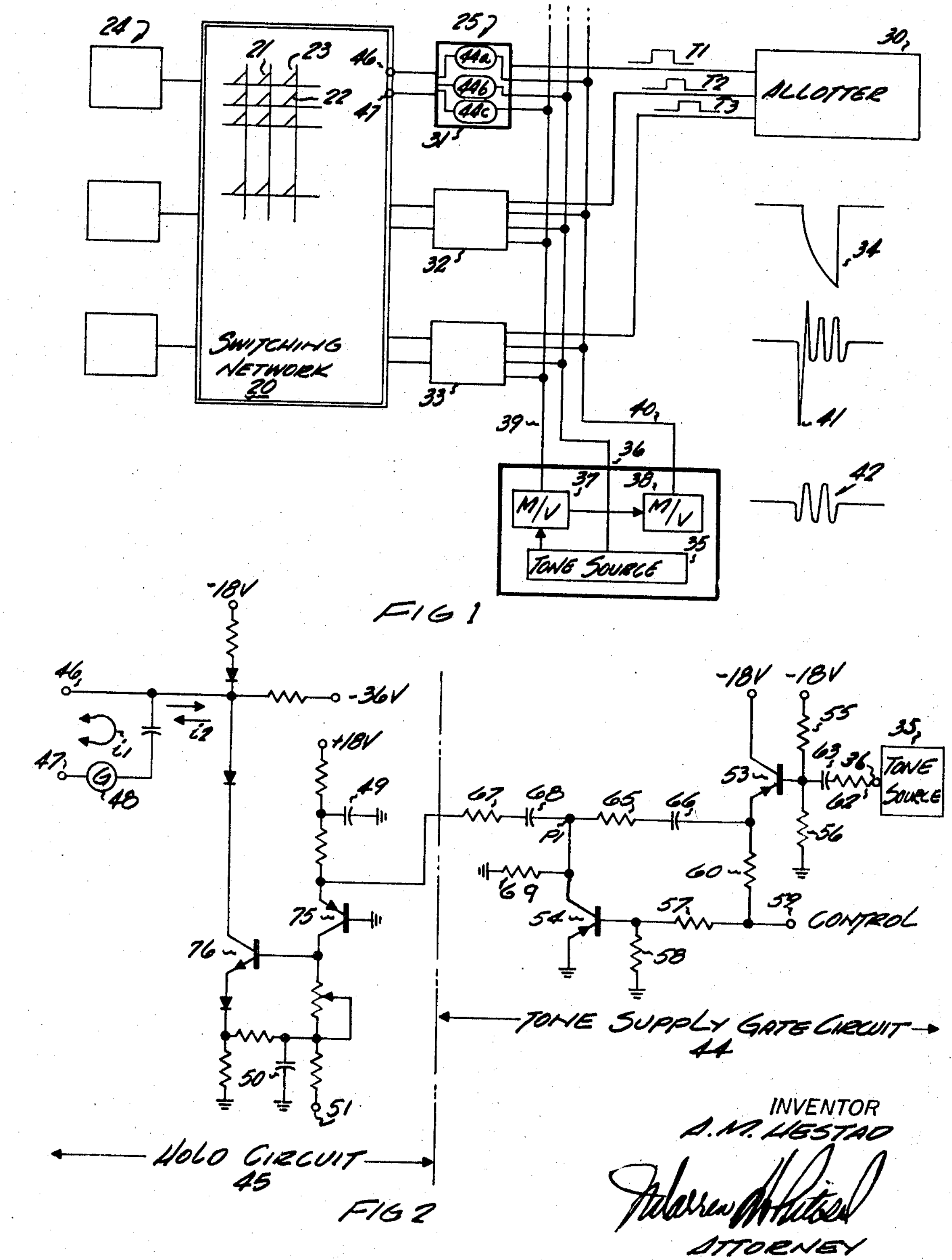

Modern switching equipment often uses semiconductor devices which are extremely sensitive to transients and other noise conditions. Usually, these systems use tones for control and other purposes. Therefore, there is a need for gating tone out through a semiconductor circuit without causing any transient conditions.

Moreover, the semiconductor circuit may very well be adapted to transmit signals, other than the control tones, which fall within the same frequency band. Since the purpose of the semiconductor circuit is to transmit these signals and not to be controlled for the sake of being controlled, these signals are hereinafter called the "useful signals." Thus, there is a need for a gate which sends out the control tones and yet maintains a complete isolation between these tones and the useful signal—without introducing spurious transients or other noise. This particular term "useful" is not to be construed as meaning that the control signals are not useful. It merely recognizes the primary purpose of the system and the subservient nature of the control.

Accordingly, an object of the invention is to provide new and improved gate circuits for sending out control signals. A related object is to maintain a complete isolation between these control tones and the useful signals. Yet another object is to accomplish these ends without introducing any unwanted transients or other spurious noise.

Yet another object of this invention is to accomplish these ends with a low cost device and without introducing new and troublesome effects.

In keeping with an aspect of this invention, these and other objects are accomplished by means of a gating circuit coupled between a tone source and the semiconductor circuit. The gating circuit includes an input path and an output path coupled together via an intermediate segment which is isolated for D.C. from input and output by a pair of capacitors. The isolated segment is coupled to ground while the gate is not conductive and uncoupled from ground when the gate becomes conductive. This way a good isolation is maintained during nonconductive conditions. Also, the switching between conductive and nonconductive states is accomplished by means of a circuit which severely limits any voltage spikes which might otherwise accompany the switching process.

The above mentioned and other features of this invention and the manner of obtaining them will become more apparent, and the invention itself will be best understood by reference to the following description of an embodiment of the invention taken in conjunction with the accompanying drawings, in which;

FIG. 1 is a block diagram of an exemplary circuit for transmitting useful signals under the control of tone signals; and FIG. 2 shows the schematic circuit of an exemplary gate circuit embodying the principles of the invention.

By way of example, the invention is here shown as being used in a telephone switching system where the "useful signals" are voice signals. The control signals are dial, busy, and ringing tones. However, the invention is not to be construed as necessarily limited thereto.

In greater detail, a semiconductor circuit is shown in FIG. 1 as a switching network 20 having a cascaded series of matrices, one of which is shown in the upper part of box 20. This network 20 is the principal circuit around which the system is designed; or, stated conversely, the real purpose for the system is to convey the useful signals through this principal circuit. The control signals are subservient to this real purpose in that they provide the means for attaining the ends.

Each matrix includes a plurality of horizontal and vertical multiples interconnected by electronic switches. For example, the horizontal 21 and vertical 22 are interconnected by the switch 23. In one embodiment, each switch (such as 23) is a PNPN diode which is sensitive to transient voltages. Thus, the tone must not cause transients which might tend to fire or release the diodes.

First and second circuits 24, 25 are connected to opposite sides of the network 20. In the exemplary telephone system, these circuits 24, 25 may be line circuits and control circuits, respectively.

In one system (please see U.S. Patent No. 3,204,044 granted Aug. 31, 1965, to V. E. Porter and assigned to the assignee of this invention), an allotter 30 is used to enable each of the control circuits 31, 32, 33, by cyclically recurring time pulses, here designated T1, T2, T3. During each of these time pulses, a path may be fired through the network 20 to the identified control circuit. The paths are fired when a firing pulse, such as 34, is applied to the left-hand side of the network by one of the line circuits 24.

Any one of three tone sources may be used in this system for signal or control purposes. Here a free running oscillator 35 provides a continuous tone which may be sent over the wire 36 as a dial tone. A multivibrator 37 may interrupt this tone uniformly in order to provide a busy tone which is sent over wire 39. The output of the multivibrator 37 may also be sent through another multivibrator 38. The output on wire 40 is a uniformly interrupted tone sent out during assymetrical periods—as on for one second and off for three seconds. This signal is used for a ringing signal.

These are only a few illustrations of how tones may be used to control semiconductor circuits. Those skilled in the art will readily perceive many other uses and illustrations.

Consider the operation of the multivibrator 38, by way of example. The output on wire 40 is assumed to be sent through a gate circuit to the semiconductor network 20 for ringing purposes. Thus, it is sent at a time when calling and called paths have been established through the network. If the gate circuit comes on in a manner which generates a voltage spike, as at 41, either an unwanted path may fire through the network 20, or a completed path may drop depending upon the polarity of the spike. Thus, for all practical purposes, the gate must eliminate the spike (as at 42).

According to the invention, a tone gate for accomplishing this purpose may be constructed as shown at 44 in FIG. 2. An inspection and comparison of FIGS. 1 and 2 reveals the manner in which the FIG. 2 schematic gate circuit fits into the blocks of FIG. 1. The tone supply 35 is here assumed to be connected via wire 36 to the gate **44*b*** of FIG. 1; however, to maintain a generic disclosure the suffix *b* is omitted from "44" in FIG. 2; it could be any of the gates **44*a*, 44*b*, 44*c***.

The gate circuit 44 is connected via a circuit 45 to the terminals 46, 47 of the semiconductor switching network 20. The useful signals (current ***i*1) is assumed to be the voice signals of the conversing subscribers which may flow when the voice gate 48 is closed and is blocked when gate 48 is open. The control signals (current *i*2) are passed through or blocked by the gate 44. There must be good isolation between these two currents when gate 44** is not conductive.

The details of hold circuit 45 are explained in my U.S. Patent No. 3,223,781 entitled "Constant Voltage Device" granted Dec. 14, 1965, and assigned to the assignee of this patent. The capacitor 49 provides a by-pass to ground for noise elimination. The capacitor 50 slows the rise time of a voltage applied to the network terminals 46, 47 when hold circuit 45 turns on. The circuit 45 is switched on and off by any suitable logic circuit (not shown) connected to the point 51.

The gate circuit 44 comprises a pair of PNP transistors 53, 54, coupled in common emitter configuration, to act as a make-break switch combination. The base bias of transistor 53 is supplied by a voltage divider 55, 56, and the bias for transistor 54 by a voltage divider 57, 58.

A control terminal 59 may be energized or de-energized to control the make-break operation. When the terminal 59 is energized with a positive polarity voltage, the base of transistor 53 is negative relative to its emitter (supplied via resistor 60). Thus, transistor 53 is on. The positive polarity at point 59 makes the base of transistor 54 positive relative to the emitter, and the transistor is off. If point 59 becomes negative, the polarities reverse. Transistor 54 turns on and transistor 53 turns off.

The tone path through the gate 44 includes an input segment 62 coupled to the base of transistor 53 via a capacitor 63. A central segment 65 has a D.C. isolation between the coupling capacitors 66, 68. The output segment includes the resistor 67.

The isolated segment 65 is always coupled to a ground potential appearing at point P1. When the transistor 54 is on (53 off), the point P1 is connected directly to the emitter ground. Any tone leaking through the transistor 53 is, therefore, drained off to ground. When the transistor 53 is on (54 off), the point P1 is coupled to ground via a high resistance 69. The resistance is of a magnitude such that virtually no tone may leak off to ground, and there is almost no attenuation of control signal.

The point is that the point P1 switches between ground potentials when the transistor 54 turns on and off. This means that wild voltage spikes are not generated across the capacitor 68. Any wild spikes which may occur are drained away via capacitor 49.

The path from tone source 35 is completed to the semiconductor network 20 via transistors 75, 76 so that tone appears as current *i2*. The normal rectifying nature of transistor junctions and ground bias connections precludes any path capable of a reverse flow of current so that current *i2* may enter gate 44.

The operation of the circuit should now be obvious. If point 59 is made negative, transistor 54 turns on to apply direct ground to point P1 and drain away any tone leaking through transistor 53.

When point 59 is made positive, transistor 54 turns off, but there is no violent voltage change at the point P1 because both ends of resistor 69 had been connected to ground. Thus, voltage does not jump wildly at capacitor 68, and there are no wild voltage spikes. The transistor 53 applies tone to the path including point P1. The resistor 69 acts essentially as an emitter loading on transistor 53. It does not attenuate the control tone signal. If the appearance of tone causes any wild voltage spike across capacitor 68, such spike is drained off to ground via capacitor 49.

While the principles of the invention have been described above in connection with specific apparatus and applications, it is to be understood that this description is made only by way of example and not as a limitation on the scope of the invention.

I claim:

1. A gate circuit for supplying control signals to a principal circuit carrying useful signals, said gate comprising path means for transmitting said control signals while blocking said useful signals from said principal circuit, an isolated segment interposed in said path means, means for applying direct ground to said isolated segment while said gate is non-conductive, and means for applying resistive ground to said isolated section while said gate is conductive.

2. The circuit of claim 1 wherein said path means comprises an input segment and an output segment, each of said segments being capacitively coupled to said isolated segment, and first transistor means for selectively sending tone over said three segments.

3. The circuit of claim 2 and second transistor means for selectively applying said direct and resistive ground to said isolated segment depending upon the off or on condition of said second transistor.

4. The circuit of claim 3 and means for simultaneously operating said first and second transistor so that said direct ground is applied when said first transistor is off and said resistive ground is applied when said first resistor is on.

5. The circuit of claim 4 and means for draining away to ground any voltage spikes occurring on said isolated segment.

6. The circuit of claim 1 and means for interrupting said tone to provide a second control signal.

7. The circuit of claim 6 and means for interrupting said interrupted tone to provide a third control signal.

References Cited

UNITED STATES PATENTS

| | | | |
|---|---|---|---|
| 2,225,907 | 12/1940 | Duguid et al. | 179—84 |
| 2,694,106 | 11/1954 | Mills | 179—84 |
| 2,745,008 | 5/1956 | Grandstaff | 179—84 X |
| 2,982,868 | 5/1961 | Emile | 307—253 |
| 2,992,338 | 7/1961 | Winters | 307—253 |

DONALD D. FORRER, *Primary Examiner.*

U.S. Cl. X.R.

178—84